(12) United States Patent
Meier et al.

(10) Patent No.: US 8,734,532 B2
(45) Date of Patent: May 27, 2014

(54) AZO DYES

(75) Inventors: Helmut-Martin Meier, Ratigen (DE); Christof Heide, Bergisch Gladbach (DE); Klaus-Günter Strumpf, Leverkusen (DE); Thomas Hübbe, Köln (DE)

(73) Assignee: Kemira Oyj (FI)

( * ) Notice: Subject to any disclaimer, the term of this patent is extended or adjusted under 35 U.S.C. 154(b) by 0 days.

(21) Appl. No.: 13/882,874

(22) PCT Filed: Nov. 29, 2011

(86) PCT No.: PCT/EP2011/071291
§ 371 (c)(1),
(2), (4) Date: Jun. 17, 2013

(87) PCT Pub. No.: WO2012/072634
PCT Pub. Date: Jun. 7, 2012

(65) Prior Publication Data
US 2013/0255006 A1    Oct. 3, 2013

Related U.S. Application Data

(60) Provisional application No. 61/482,349, filed on May 4, 2011.

(30) Foreign Application Priority Data

Nov. 30, 2010   (EP) ................................... 10193156

(51) Int. Cl.
*D06P 1/02*     (2006.01)
*C09B 31/047*   (2006.01)

(52) U.S. Cl.
USPC ................... 8/466; 8/639; 8/641; 534/760

(58) Field of Classification Search
USPC ................ 8/466, 639, 641; 534/760
See application file for complete search history.

(56) References Cited

U.S. PATENT DOCUMENTS 5,569,749    A       10/1996   Kouno et al.
2003/0158395 A1      8/2003    Ebenezer et al.

FOREIGN PATENT DOCUMENTS

| CN | 101092522   A   | 12/2007 |   |
|----|-----------------|---------|---|
| EP | 0111779     A2  | 6/1984  |   |
| EP | 0217060     A1  | 4/1987  |   |
| EP | 0652261     A1  | 5/1995  |   |
| GB | 1342858     A   | 1/1974  |   |
| GB | 1453278     A   | 10/1976 |   |
| JP | 57-051767       | * 3/1982 | ............ C09D 11/00 |
| JP | 57051767    A   | 3/1982  |   |
| WO | 9966878     A2  | 12/1999 |   |
| WO | WO 99/66878     | * 12/1999 |   |

OTHER PUBLICATIONS

STIC Search Report dated Aug. 7, 2013.*
The International Preliminary Report on Patentability dated Jun. 13, 2013.
The International Search Report and Written Opinion dated Mar. 6, 2012.

* cited by examiner

*Primary Examiner* — Eisa Elhilo
(74) *Attorney, Agent, or Firm* — Thomas Horstemeyer, LLP

(57) ABSTRACT

The present invention relates to new azo dyes, a process for their preparation, and their use for dyeing or printing fibrous materials, to produce materials with brownish shades.

16 Claims, No Drawings

AZO DYES

CROSS REFERENCE TO RELATED APPLICATION

This application is the 35 U.S.C. §371 national stage of PCT application entitled "AZO Dyes," having serial number PCT/EP2011/071291, filed on 29 Nov. 2011, which claims priority to European Application No. 10193156.6, filing date Nov. 30, 2010, and U.S. Provisional Application No. 61/482, 349, filing date May 4, 2011, each incorporated by reference in their entireties.

The invention relates to new azo dyes, a process for their preparation, and their use for dyeing or printing materials, in particular organic or fiber-containing materials, to produce materials with brownish shades.

In order to produce papers with a brown shade, it is known to dye paper with mixtures of different dyes. For example, WO-A 2007/057370 is directed to liquid formulations containing the direct dyes C.I. Direct Brown 44 and Direct Yellow 11. EP-A-1 258 562 relates to dye mixtures containing two anionic dyes each with a different, defined absorption maximum. WO-A 2004/048478 teaches the production of a low-salt liquid formulation of C.I. Direct Brown 44. The production process comprises production of vesuvine from m-phenylenediamine and direct conversion to C.I. Direct Brown 44. Vesuvine and its coupling products, such as C.I. Direct Brown 44, have been known since the beginning of dye chemistry. For instance, the Colour Index (C.I.) shows that C.I. Direct Brown 44 is obtained by formally coupling two parts of sulfanilic acid onto one part of vesuvine (Bismarck Brown C.I. 21000). However, the lightfastness of the produced brown papers is often not sufficient.

In paper mills or paper processing industry, brownish papers often are stored without being prevented from the influence of light or weather, which results in change of color or color shade. Therefore, there is a need for improving the lightfastness of brownish papers.

Surprisingly, it has been found that this problem can be solved by new azo dyes containing at least two azo groups which are linked by a biphenyl group and which are attached to benzene or naphthalene rings at the other side. These azo dyes are soluble in water and enable the production of materials, in particular of organic or fiber-containing materials, e.g. paper or board, in brownish shades and with high lightfastness. In particular, it was surprising that the brownish shade could be obtained with the use of one dye only, in contrast to the prior art, which commonly uses dye mixtures for that purpose.

Thus, the present invention provides compounds of the general formula (1)

wherein

R1, R2, independently of each other, represent hydrogen, substituted or unsubstituted alkyl, substituted or unsubstituted alkoxyl, substituted or unsubstituted aryl, substituted or unsubstituted phenyl, amino, sulfonic, carboxyl, hydroxyl, or halogen groups;

C, D, independently of each other, represent

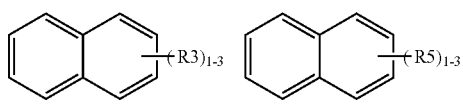

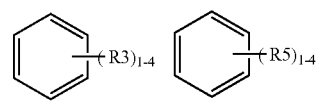

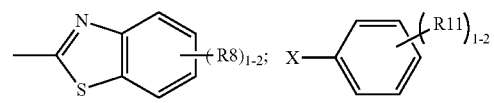

R3 and R5, independently of each other, represent hydrogen, substituted or unsubstituted alkyl, substituted or unsubstituted alkoxyl, substituted or unsubstituted aryl, substituted or unsubstituted phenyl, amino, nitro, sulfonic, carboxyl, hydroxyl, or halogen groups; R8, R11 and X are as defined below;

R4, R6, independently of each other, represent hydrogen, substituted or unsubstituted alkyl, substituted or unsubstituted alkoxyl, substituted or unsubstituted aryl, substituted or unsubstituted phenyl, amino, sulfonic, carboxyl, hydroxyl, or halogen groups;

m, n, r, s, independently of each other, are 0 or 1,

A, B independently of each other, represent

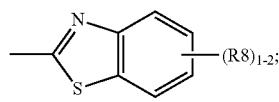

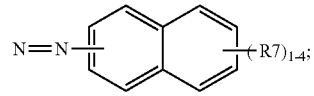

formula 1

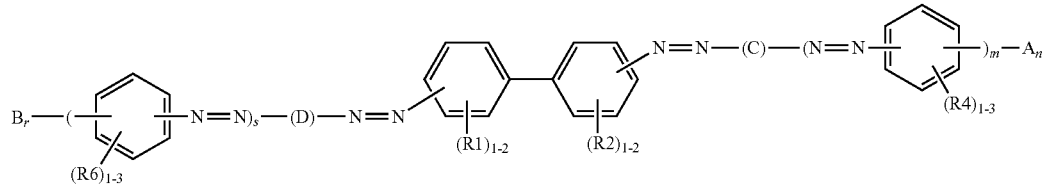

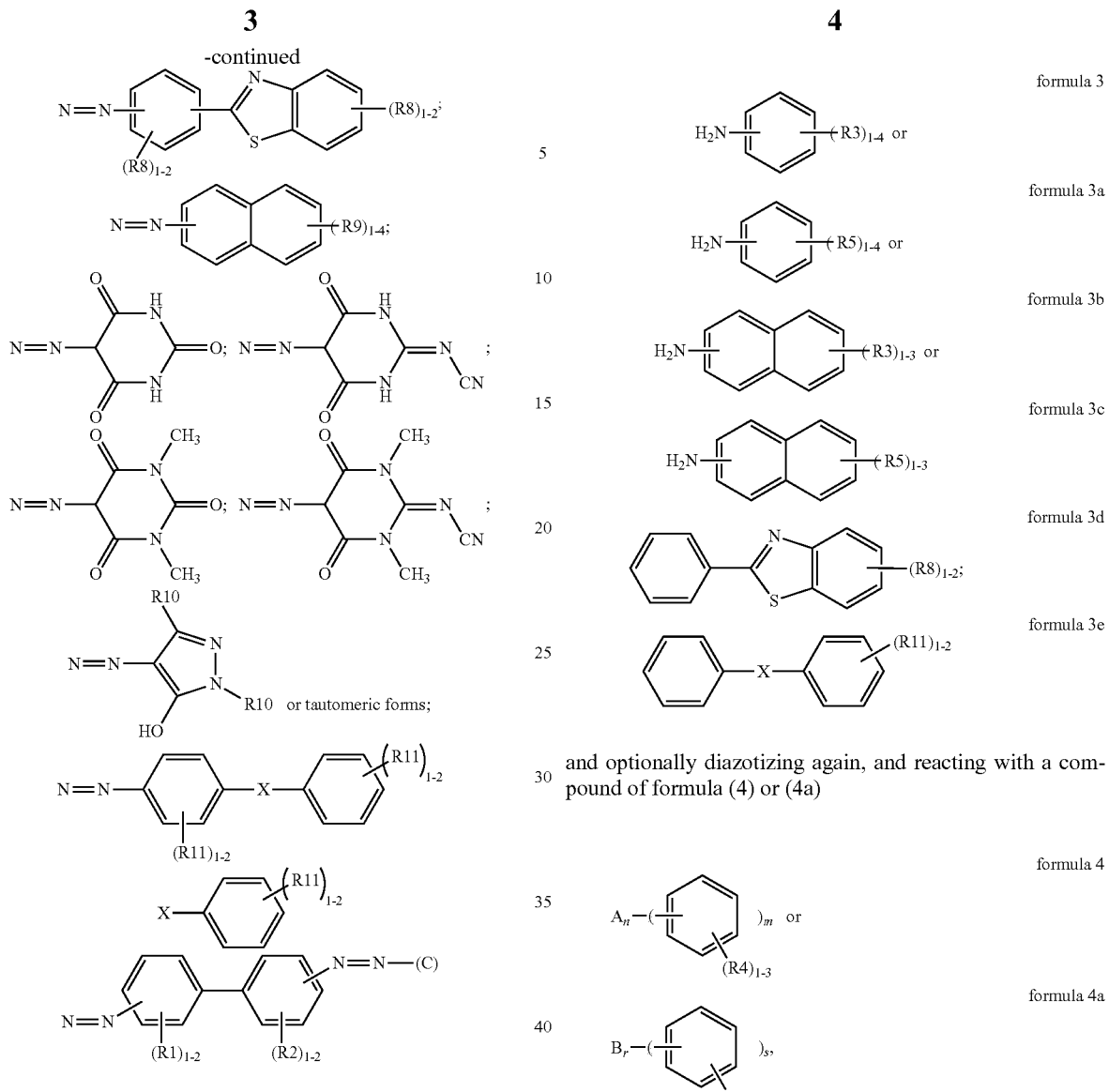

wherein R1, R2 and C are as defined above,

R7 to R11 represent, independently of each other, hydrogen, substituted or unsubstituted alkyl, substituted or unsubstituted alkoxy, substituted or unsubstituted aryl, substituted or unsubstituted phenyl, sulfonic, carboxyl, amino, nitro, hydroxyl, or halogen groups; and X represents O, S, NH, $SO_2$, CH=CH, NHCO, NH—CO—NH, N=N, or N=N(O).

Surprisingly, it was found that compounds of formula (1) are soluble in water, and materials dyed with those dyes show improved lightfastness.

The invention also refers to a process for preparing the compounds of formula (1), comprising tetra-azotizing a compound of formula (2)

coupling the obtained product with a compound of formula (3), (3a), (3b), (3c), (3d) or (3e)

and optionally diazotizing again, and reacting with a compound of formula (4) or (4a)

with the proviso that m is 1 in formula (4) and s is 1 in formula (4a), to obtain the compound of formula (1).

Further, the invention refers to the use of the compounds of formula (1) for dyeing or printing materials, in particular materials containing cellulose and/or polyamide, preferably paper or board. In addition, the invention relates to a process for dyeing or printing materials, in particular materials containing cellulose and/or polyamide, preferably paper or board, and to materials or paper obtained by that process. Preferred embodiments of the invention are described in the description hereinafter and the claims. In the present invention, the term paper is used to cover paper or board.

In formula (1), the substituents R1 to R11 each are, independently of each other, attached to the corresponding aromatic rings at any position thereof. This also includes that in case of the presence of a naphthyl group in C and/or D, the substituents R3 and/or R5 can be attached to the naphthyl ring at any position thereof. Likewise, the substituents C and D are attached to the azo groups at any position of their aromatic rings. In the context of the invention, the alkyl or alkoxyl group can be linear or branched. If the alkyl, alkoxyl, aryl or phenyl group is substituted, the possible substituents are amino, hydroxyl, sulfonic, or carboxylic groups, which groups can be attached at any position of the alkyl, alkoxyl, aryl or phenyl group. In the present invention, alkyl and alkoxy mean $C_1$-$C_4$ alkyl and $C_1$-$C_4$ alkoxy, respectively.

In the present invention, a sulfonic group means the group —$SO_3M$, wherein M is a cation. Preferably M is hydrogen, alkaline metal, earth alkaline metal, ammonium, or mono-, di-, tri- or tetra-substituted ammonium, in particular M is mono-$C_{1-5}$-alkyl-, di-$C_{1-5}$-alkyl-, tri-$C_{1-5}$-alkyl-, tetra-$C_{1-5}$-alkylammonium, mono-$C_{1-5}$-hydroxykyl-, di-$C_{1-5}$-hydroxyalkyl-, tri-$C_{1-5}$-hydroxykyl-, tetra-$C_{1-5}$-hydroxykyl-ammonium, or benzyltri-$C_{1-5}$-hydroxyalkylammonium; or ammonium based on amines derived from nitrogen-containing five- or six-membered saturated heterocycles, such as pyrrolidine, piperidine, morpholine or piperazine or their N-monoalkyl- or N,N-dialkyl-substituted products. In the present invention, sulfonic and carboxyl groups are present in the form of free acids or in the form of salts, preferably alkali, earth alkali, ammonium, alkyl ammonium, or alkanol ammonium salts, in particular as alkanol ammonium salts. Preferred ammonium salts are defined above.

In a preferred embodiment, R1 and/or R2, in particular both R1 and R2, appear each one time at the biphenyl moiety. In a further preferred embodiment, R1 and/or R2, in particular both R1 and R2, are sulfonic, methoxy, or hydroxyl groups, in particular sulfonic groups. R10 preferably represents hydrogen, $CH_3$, COOH, COOalkyl, Cl, sulfonic (in particular $SO_3H$), unsubstituted aryl, or aryl substituted by hydrogen, $CH_3$, COOH, COOalkyl, Cl, or sulfonic (in particular $SO_3H$) groups. Preferred groups for R1 to R9 and R11 are amino, hydroxyl or sulfonic groups, in particular amino or sulfonic groups, most preferably sulfonic groups.

Preferred compounds of formula (1) are:

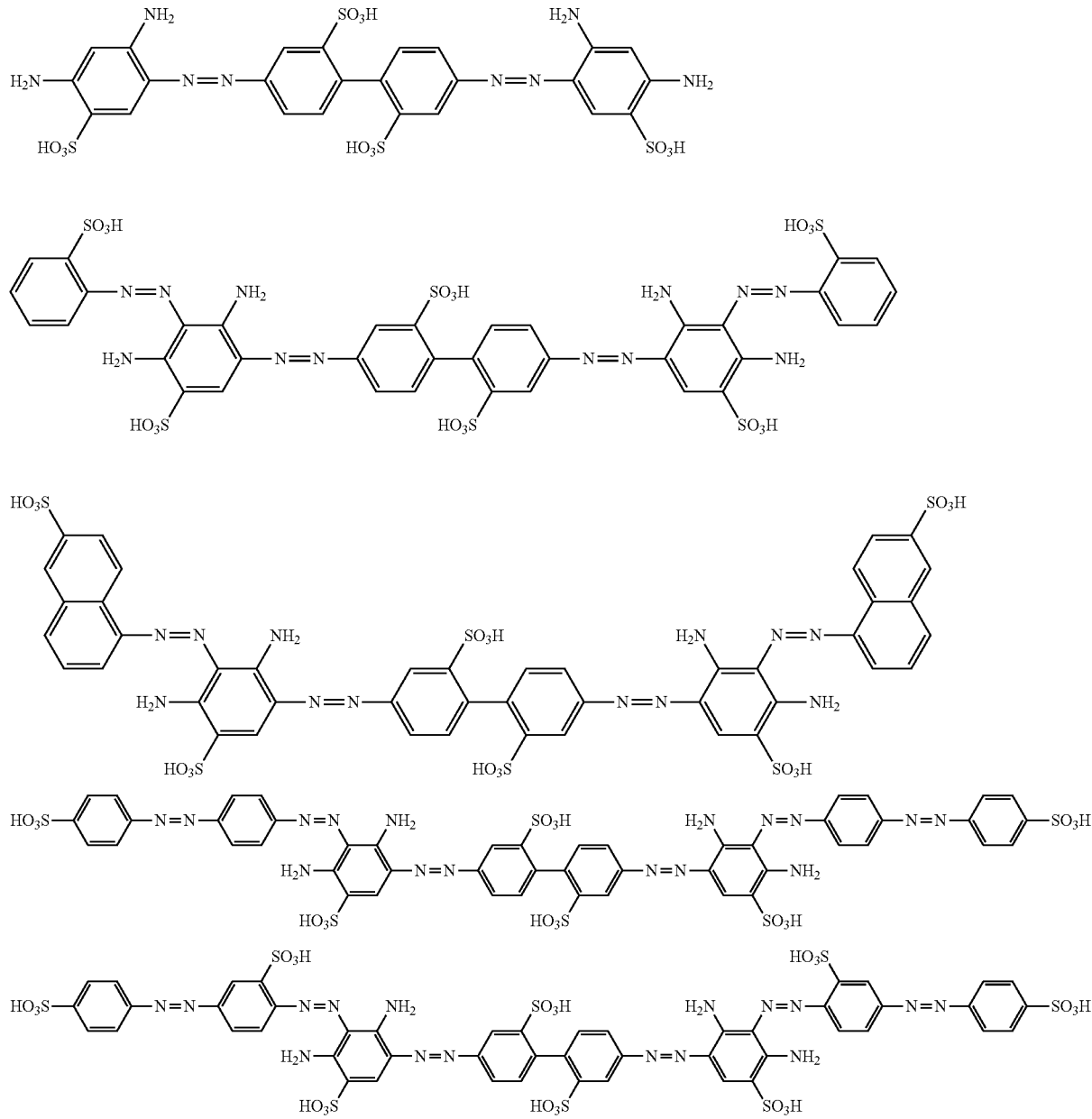

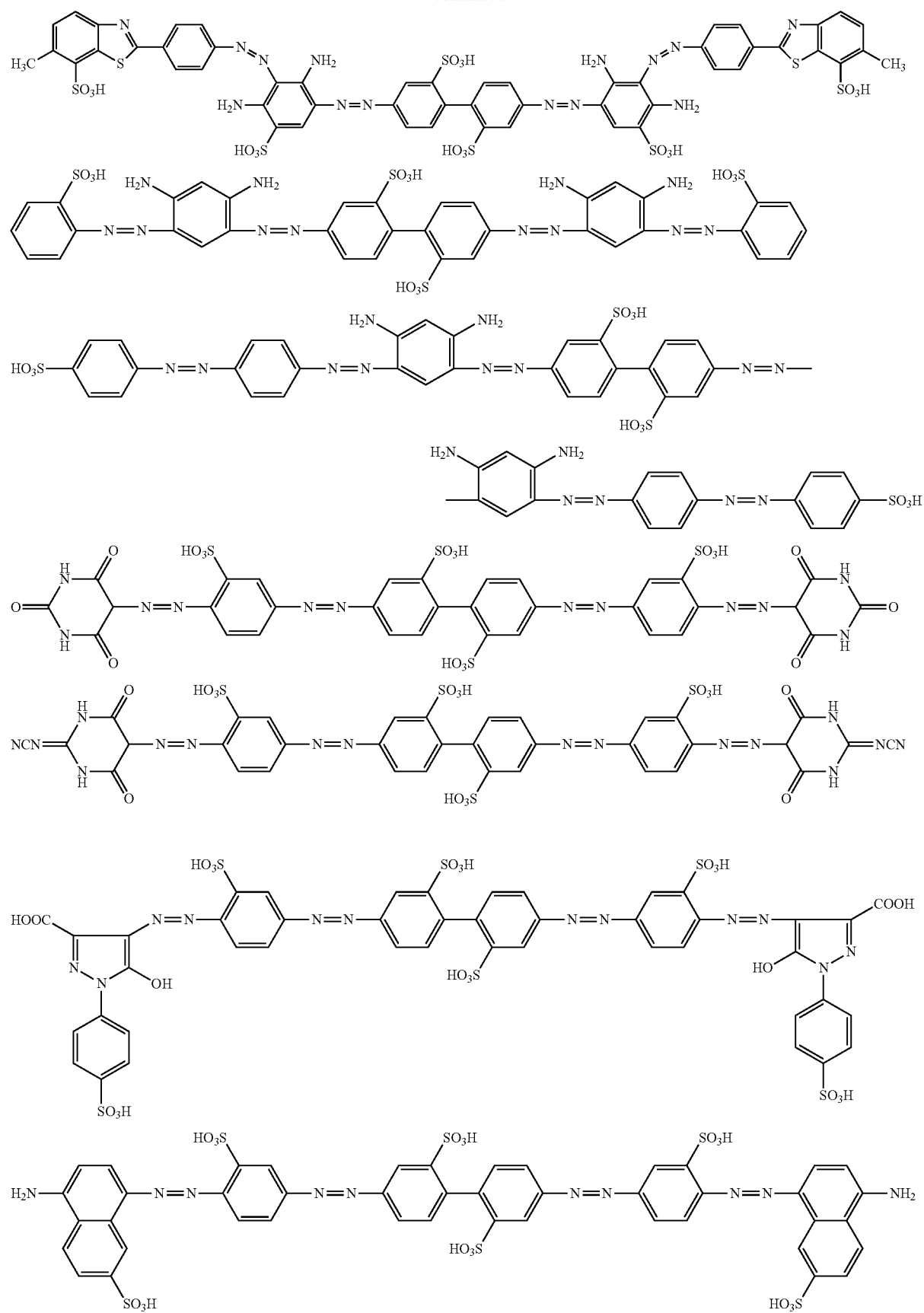

-continued
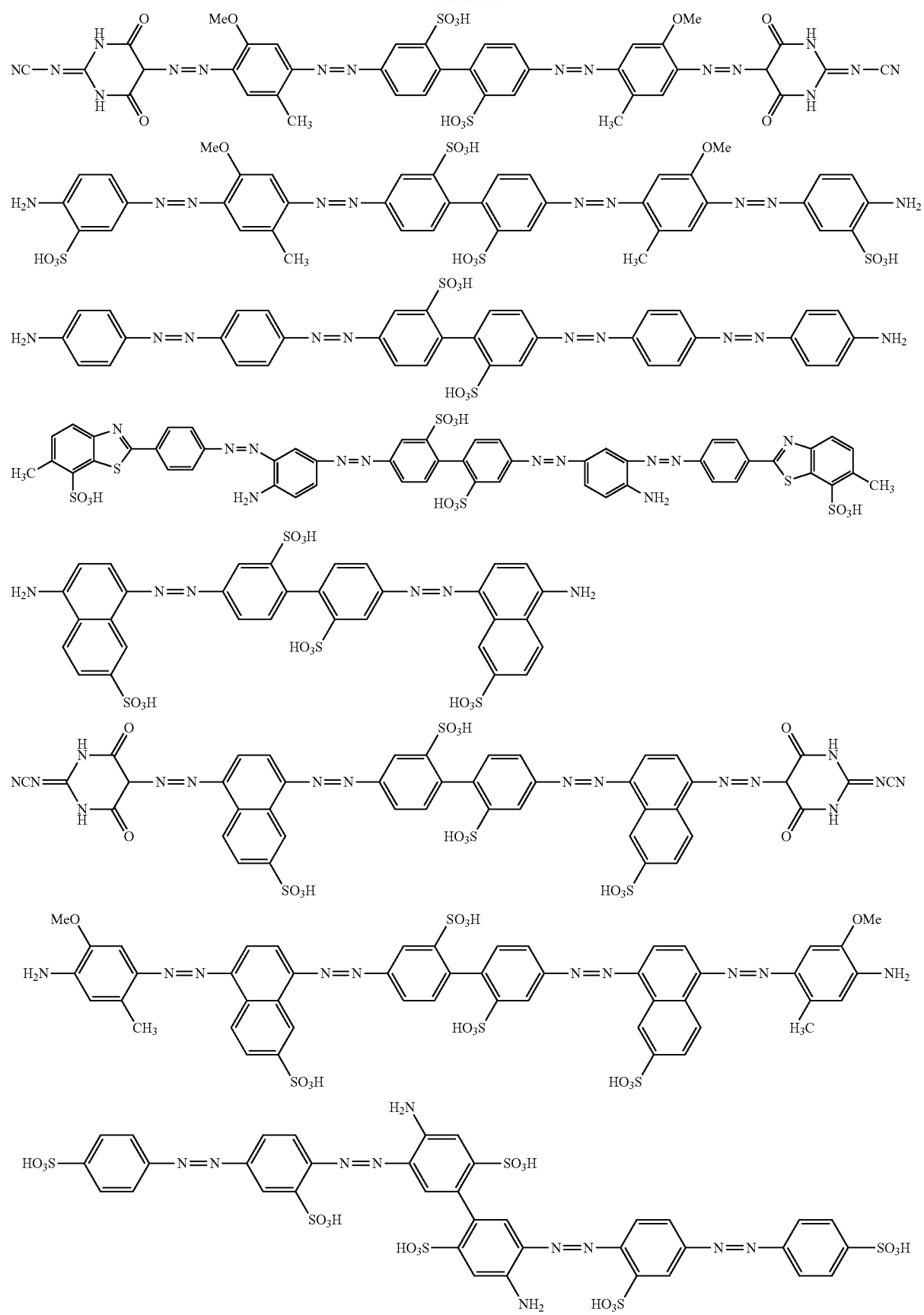

-continued
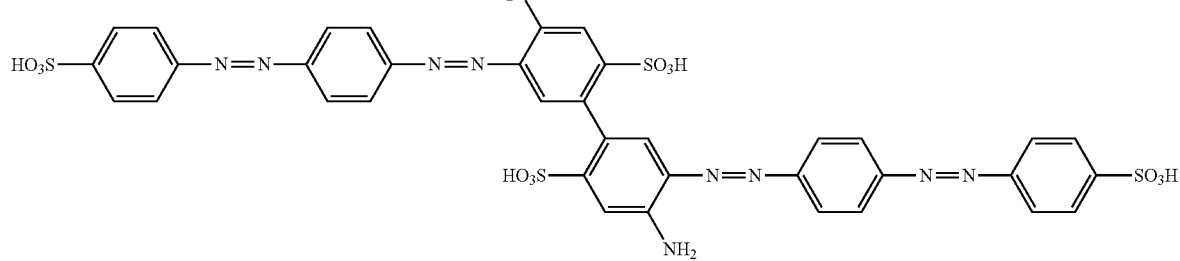
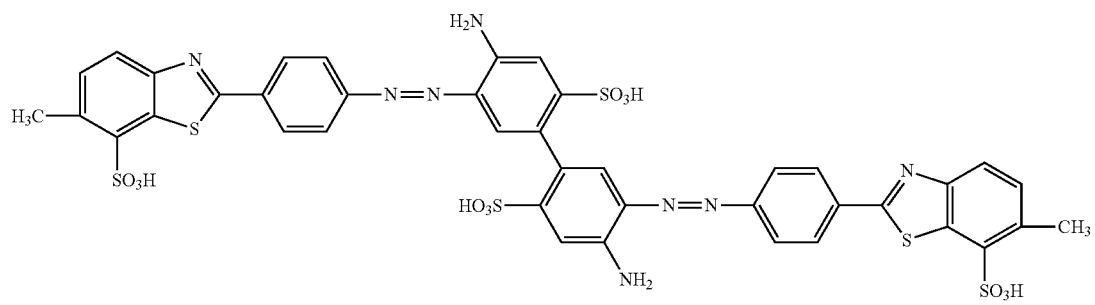
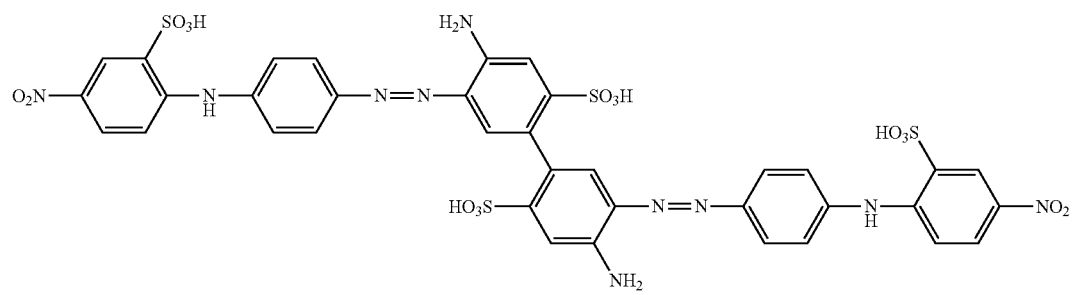
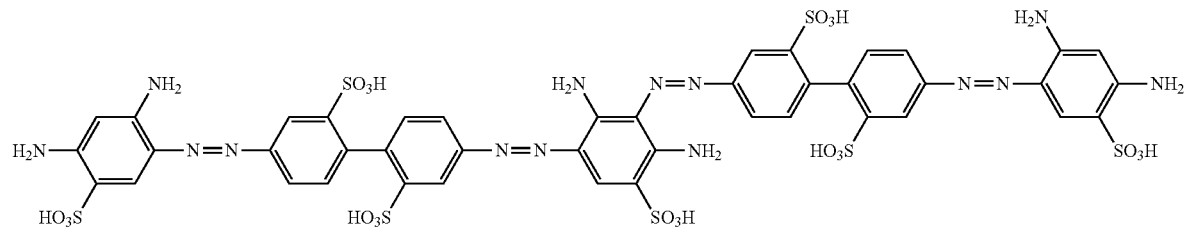
More preferred compounds of formula (1) are:
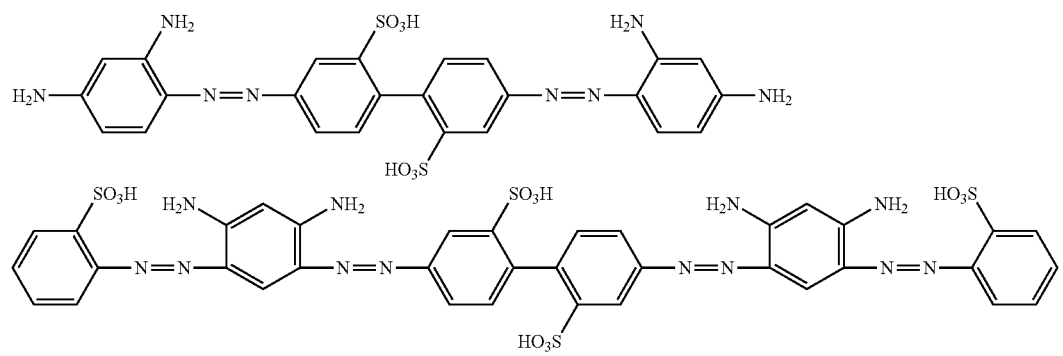

-continued

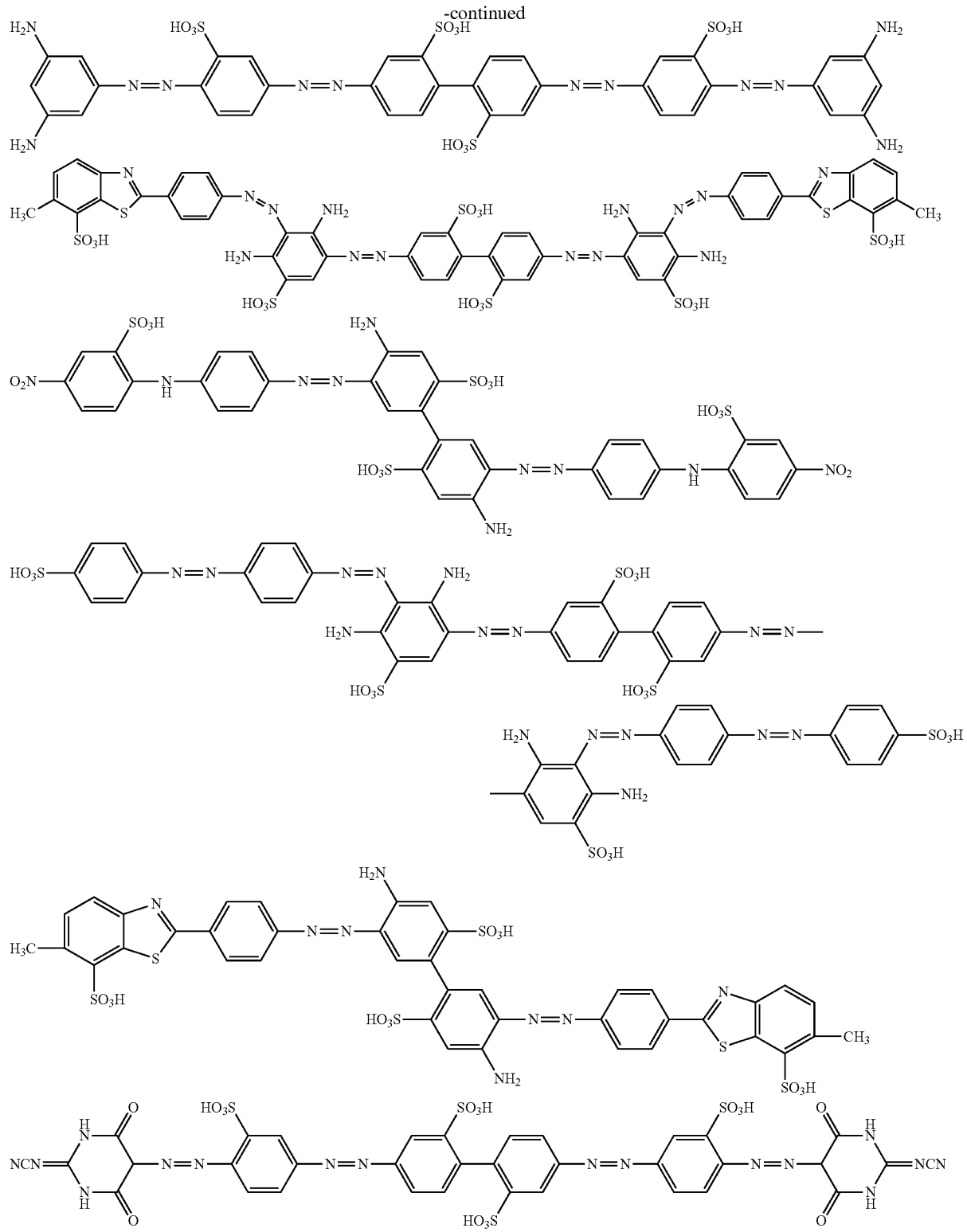

The invention also provides a process for preparing the compounds of formula (1) using known procedures, such as diazotization and coupling steps. Generally, the compounds can be prepared by tetra-azotizing a starting primary aromatic diamine, e.g. a diamino-biphenyl compound, and coupling to one another primary aromatic amine, wherein, depending on the formula (1) compound, also two different primary amines may be used. Depending on the desired compound of formula (1), the obtained reaction product is diazotized or tetra-azotized again and coupled to a third primary aromatic amine, which in turn can be diazotized and coupled to a fourth compound to yield the desired compound. In the coupling steps also two different primary amines may be used. In case of unsymmetrical compounds of formula (1), during preparation the protection of amino groups to control the coupling steps may be appropriate. The compounds of formula (1) also may be prepared by starting with appropriate azo compounds and react those with corresponding amino-containing compounds to yield the desired dyes.

As an example, the synthesis of the above described preferred dye having the formula

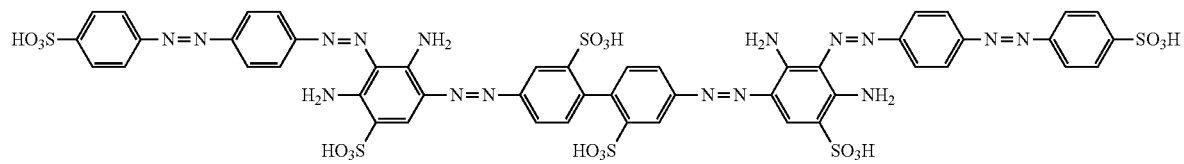

can be accomplished by starting with an appropriate azo compound, such as yellow acid having the formula

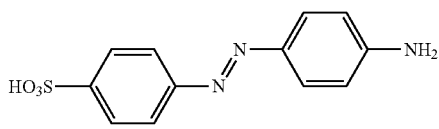

which is diazotized and reacted with an amino-containing compound, such as

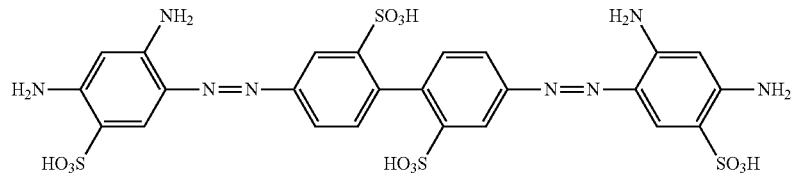 [SMILES: Nc1cc(N)c(S(=O)(=O)O)cc1N=Nc1ccc(-c2ccc(N=Nc3cc(S(=O)(=O)O)c(N)cc3N)cc2S(=O)(=O)O)c(S(=O)(=O)O)c1]

to yield the desired azo dye.

Azo dyes and their production using diazotization and coupling steps are well-known and familiar to those skilled in the art.

In a further preferred embodiment, generally first a diazonium salt is prepared followed by a coupling reaction. In a suitable embodiment, an amine compound is dissolved or suspended in aqueous hydrochloric or sulfuric acid, and a concentrated aqueous sodium nitrite solution is added. An excess of 2.5-3 equivalents of acid per equivalent of amine compound is further added at a temperature of 0-10° C., preferably of 0-5° C., to generate the diazonium salt. The obtained acidic diazonium salt is added to a, preferably aqueous, solution of the coupling component. The coupling reaction may be completed after mixing of the components.

Another suitable procedure starts with solving the amine compound in water or weak alkaline solution, and adding the calculated amount of sodium nitrite solution to this amine solution. The obtained amine-nitrite solution is stirred into an ice-cooled acid solution which is present in a vessel. It is also possible to add the acid or ice-cooled acid solution to the amine-nitrite solution at a temperature of 0-10° C., preferably of 0-5° C. Depending on the amine compound even 0-40° C. may be possible.

Further, it is possible to dissolve water-insoluble amine compounds in organic solvents, such as ethanol, acetone, pyridine, acetic acid, or formic acid. After addition of acid, diazotizing is carried out in the usual manner by means of sodium nitrite solution. Instead of sodium nitrite, diazotization agents, such as nitrosyl sulfuric acid, nitrosyl chloride, alkylnitrite or nitrous gases also can be used. Further, it is possible to add emulsifiers, dispersing agents or surfactants during the reaction.

The preparation process is not limited to the methods described above, but may be carried out by applying procedures known from the state of the art for diazotization and coupling procedures or as known from the literature (e.g. Klaus Hunger (Editor), *Industrial Dyes*, Wiley-VCH, Weinheim, 2003, pages 19, 28).

In a preferred process of the invention, the compounds of formula (1) with preferably both m and s being 1 are obtained by the following procedure. The process starts with an amine compound of formula (2)

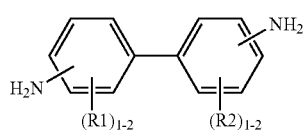

formula 2 which is tetra-azotized, and coupled to an amine compound of formula (3) or (3a) or (3b) or (3c)

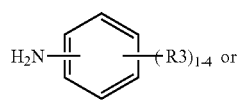

formula 3

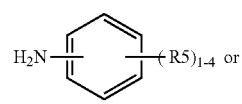

formula 3a

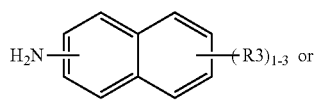
formula 3b

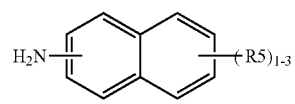
formula 3c wherein, as in formula (1), the substituents are located at any possible position of the aromatic ring. Depending on the desired target compound, the product obtained can be again diazotized and coupled to a compound of formula (4) and/or (4a), with the proviso that m is 1 in formula (4) and s is 1 in formula (4a), to yield the compound of formula (1).

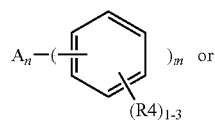
formula 4

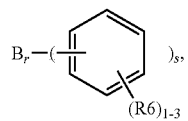
formula 4a

Furthermore, it is possible to obtain the compounds of the invention by diazotizing compounds of formulae (3), (3a), (3b), or (3c), and subsequently coupling the corresponding diazotized compounds to compounds of formula (2). The resulting compounds are used as coupling components for diazotized compounds of formula (4) and/or (4a). In this case, it is necessary that at least R4 and R6 appear multiple on the aromatic ring and at least one of residue R4 or R6 is an amino group.

It is also possible to start with appropriate azo compounds with amino groups to yield the azo dyes of the invention.

Preferred compounds of formula (2) are:

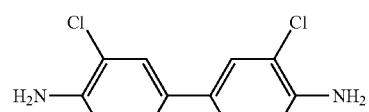

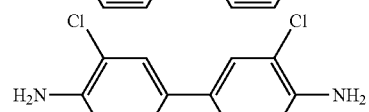

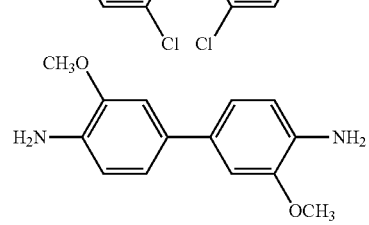

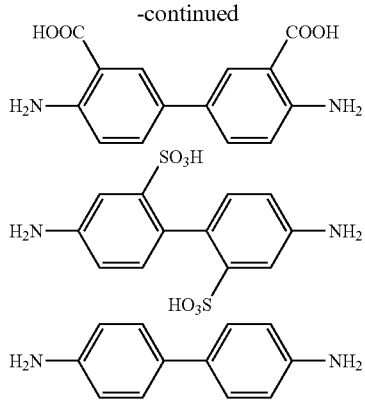

The substituents shown also may be located at other positions of the aromatic rings.

Preferred compounds of formula (3) or (3a) are:

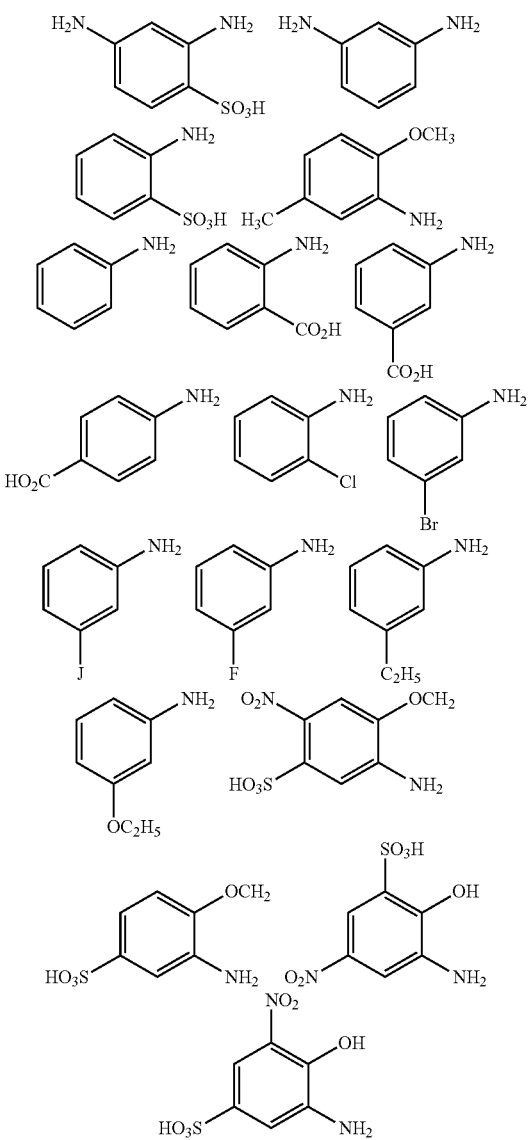

Preferred compounds of formula (3b) or (3c) are:
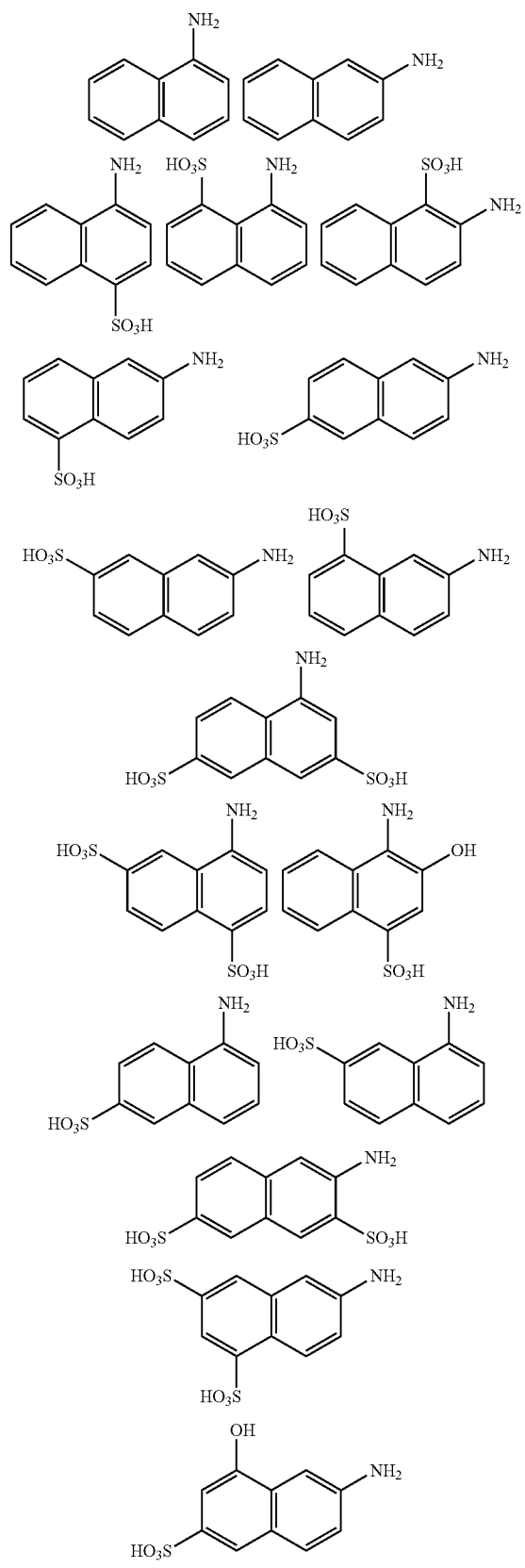
Preferred compounds of formula (4) or (4a) are:
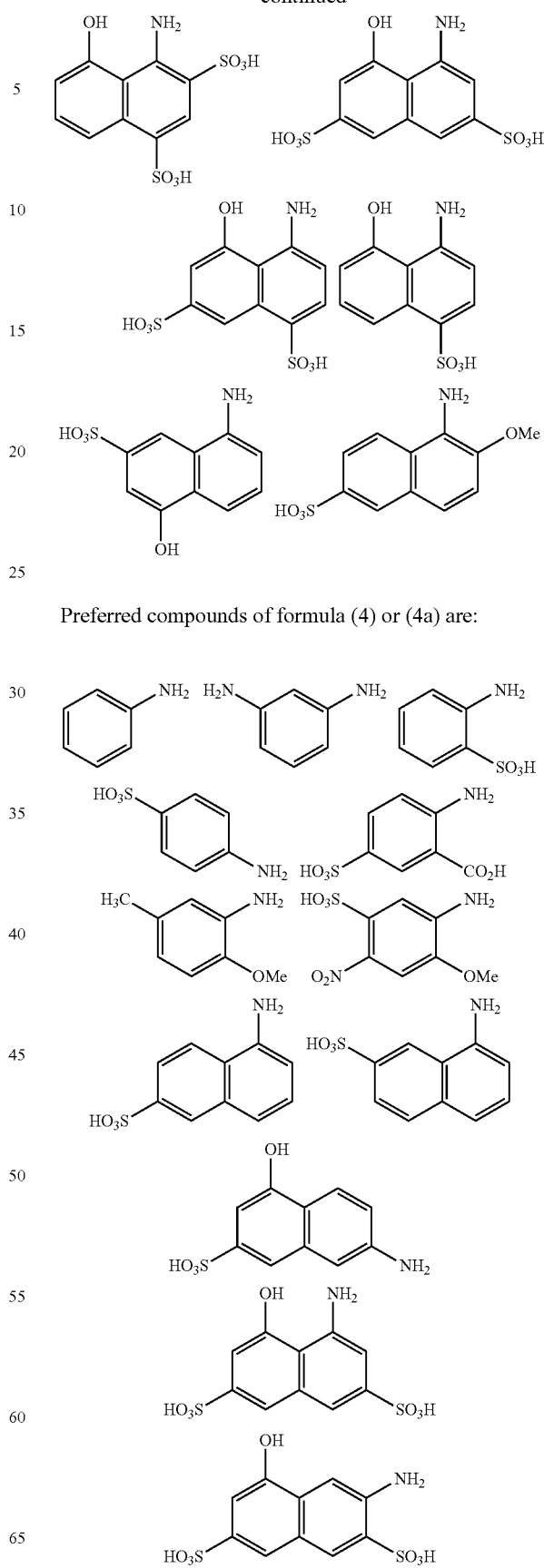

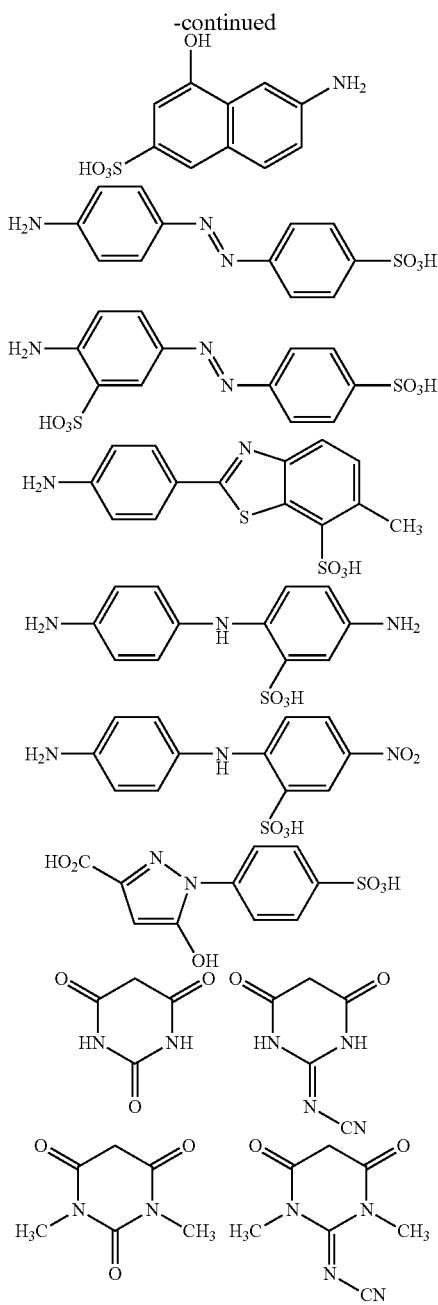

The dyes of formula (1) can be isolated from the reaction medium by conventional processes, for example by salting out with an alkali metal salt, filtering and drying, if appropriate under reduced pressure and at elevated temperature. Depending on the reaction and/or isolation conditions, the dyes of formula (1) can be obtained as free acid, as salt or as mixed salt which contains for example one or more cations selected from alkali metals ion, for example the sodium ion, or an ammonium ion or alkyl ammonium cation, for example mono-, di- or trimethyl-, or -ethyl ammonium cations, or an alkanol ammonium cation, for example mono-, di- or triethanol ammonium cations. The dyes can be converted from the free acid into a salt or into a mixed salt or vice versa or from one salt form into another one by conventional techniques. If desired, the dyes can be further purified by diafiltration, wherein undesired salts and synthesis by-products are separated from the crude anionic dye. The removal of undesired salts and synthesis by-products and a partial removal of water from the crude dye solution can be carried out by means of a semi-permeable membrane by applying a pressure whereby the dye is obtained, without the undesired salts and synthesis by-products, as a solution and if desired as a solid material in a conventional manner. Such procedures belong to the state of the art and are described for example in WO-A 2007/057370.

The compounds of formula (1) can be utilized in form of a liquid formulation, preferably an aqueous liquid formulation, or a moist press cake, or in dried form. In the last two cases, when preparing a solution alkylamine is preferably added.

According to a more preferred embodiment of the invention, the compound of formula (1) is present or used in form of an aqueous liquid formulation comprising at least one alkylamine whose one, two or three alkyl radicals may each be substituted by one or two hydroxyl groups and/or amino groups and/or interrupted by one or two oxygen atoms in ether function, the alkylamine being present in an amount of 0.5-15% by weight based on the total weight of the liquid formulation. Preference is given to alkylamines, whose two or three alkyl radicals may each be substituted by one or two hydroxyl groups and/or interrupted by one or two oxygen atoms in ether function. Particular preference is given to mono-, di- and trialkanolamines. Preferred alkylamines are ethanolamine, diethanolamine, triethanolamine, dimethylethanolamine, N-methyl-diethanolamine, monomethylethanolamine, 2-(2-aminoethoxy)ethanol, or aminoethylethanolamine. Particular preference is given to ethanolamine, especially diethanolamine and triethanolamine and ethoxylated or propoxylated triethanolamine.

Suitable additives in the liquid formulation can be $C_1$-$C_4$-alkanols, for example methanol, ethanol, propanol, isopropanol, butanol, isobutanol, sec-butanol or tert-butanol; carboxamides, such as N,N-dimethylformamide or N,N-dimethylacetamide; ketones or keto alcohols, such as acetone, methyl ethyl ketone or 2-methyl-2-hydroxypentane-4-one; mono-, oligo- or polyalkylene glycols or -thioglycols which have $C_2$-$C_6$-alkylene units, such as ethylene glycol, 1,2- or 1,3-propylene glycol, 1,2- or 1,4-butylene glycol, hexane-1,6-diol, diethylene glycol, triethylene glycol, dipropylene glycol, thiodiglycol, polyethylene glycol or polypropylene glycol; other polyols, such as glycerol or hexane-1,2,6-triol; $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl ether or triethylene glycol monoethyl ether; $C_1$-$C_4$-alkyl esters of polyhydric alcohols, γ-butyrolactone or dimethylsulfoxide. Suitable solubilizing additives are further lactams, such as ε-caprolactam, pyrrolidin-2-one or N-methylpyrrolidin-2-one, cyclic ureas, such as 1,3-dimethylimidazolidin-2-one or 1,3-dimethylhexahydropyrimid-2-one, and also polyacrylic acids, polyacrylic acid derivatives, polyvinyl acetates, polyvinyl alcohols, polyvinylpyrrolidones, polysiloxanes or copolymers of the respective monomers. It is further possible to use oligomers of ethylene oxide or propylene oxide or derivatives of these oligomers.

The dyes of formula (1) and their salts are particularly suitable for dyeing or printing organic material, fibrous or fiber-containing material, in particular materials containing lignocellulosic material, cellulose and/or polyamide, preferably materials consisting of natural or synthetic polyamides, cellulose, lignocellulosic material, or substrates like wool, leather, textile or paper or board. The material may be of wood and/or straw origin, mechanically and/or chemically produced, in particular by any suitable pulping or refining technique normally employed in papermaking, e.g. by thermomechanical pulping (TMP), chemi-mechanical pulping (CMP), chemithermomechanical pulping (CTMP), groundwood pulping (GW), alkaline sulphate (kraft) pulping, acid sulphite pulping and/or semichemical pulping. The material may also contain or consist of recycled fiber or pulp, especially made of waste paper. Polyamide or lignocellulosic material may be in fibrous or non-fibrous form. The fibrous material is preferably of wood and/or straw origin, mechanically and/or chemically obtained, e.g. by thermo-mechanical pulping (TMP), chemi-mechanical pulping (CMP), chemithermomechanical pulping (CTMP), groundwood pulping (GW), alkaline sulphate (kraft) pulping, acid sulphite pulping and/or semichemical pulping. The fibrous material or pulp may also contain or consist of recycled fiber or pulp, especially made of waste paper. The pulp used may contain, in addition to the fibrous material, e.g. fillers and/or auxiliary chemicals, before or after dyeing the pulp. In a most preferred embodiment, the material is paper or board. The obtained shades can be orange to brownish, or reddish to brownish. Further, the dyes of formula (1) and their salts are suitable for producing printing inks, especially ink-jet inks, and for using these inks for printing materials, in particular organic or fibrous material, for example materials consisting of natural or synthetic polyamides, cellulose or substrates like wool, leather, textile, paper or board. Preferably, the dyes of formula (1) and their salts are used to dye paper in orange to brownish shades, in particular in brownish shades.

The invention also relates to a process for dyeing or printing organic material, fibrous or fiber-containing material, in particular materials containing lignocellulosic material, cellulose and/or polyamide, preferably lignocellulosic- or cellulose-containing material, wherein the material is brought into contact with the compound of formula (1), wherein that compound is contained in a liquid formulation, a moist press cake, or in dried form, as described above. Preferably the material is brought into contact with an aqueous liquid formulation containing the compound of formula (1). Suitable materials are the same as described above with respect to the use of the dye of formula (1). The material may be of wood and/or straw origin, mechanically and/or chemically produced, in particular by any suitable pulping or refining technique normally employed in papermaking, e.g. by thermomechanical pulping (TMP), chemimechanical pulping (CMP), chemithermomechanical pulping (CTMP), groundwood pulping (GW), alkaline sulphate (kraft) pulping, acid sulphite pulping and/or semichemical pulping. The material may also contain or consist of recycled fiber or pulp, especially made of waste paper. Polyamide or lignocellulosic material may be in fibrous or non-fibrous form. The fibrous material is preferably of wood and/or straw origin, mechanically and/or chemically obtained, e.g. by thermo-mechanical pulping (TMP), chemi-mechanical pulping (CMP), chemithermomechanical pulping (CTMP), groundwood pulping (GW), alkaline sulphate (kraft) pulping, acid sulphite pulping and/or semichemical pulping. The fibrous material or pulp may also contain or consist of recycled fiber or pulp, especially made of waste paper. The pulp used may contain, in addition to the fibrous material, e.g. fillers and/or auxiliary chemicals, before or after dyeing the pulp. The dyeing of paper can be carried out in the pulp.

The invention also relates to a process for dyeing paper or board, wherein a pulp or a paper sheet or web is brought into contact with an aqueous preparation or formulation as described above. Preferably, the paper sheet or web is contacted with the aqueous preparation in a size press, or in a coating application, preferably in a coating colour.

The following Examples illustrate the invention without limiting its scope.

EXAMPLES

The Examples demonstrate the synthesis of dyes of formula (1) and of comparative dyes, and their use in an aqueous preparation for dyeing paper. The lightfastness of the obtained paper was determined according to the test method described below. In case that products were salted out in the examples, the term x % b.v. means x % of volume of reaction mixture in g salt.

Dyeing Process:

7 parts by weight of chemically bleached pinewood sulfite cellulose and 3 parts by weight of chemically bleached birchwood sulfite cellulose were beaten into water in a mixer. 1 part by weight of the liquid dye preparation was added to this stuff. Paper was made from that after a mixing time of 20 minutes.

Lightfastness Test According to EN ISO 105-B02:

Test for color fastness—Part B02: Color fastness to artificial light: The xenon arc fading lamp test (ISO 105-B02:1994, including amendment 1:1998), which is commonly used by those skilled in the art, was used. Lightfastness is defined by the degree of decomposition of dyeing or printings on paper by sun light or artificial light. In the present test, paper having been dyed and radiated by the xenon arc fading lamp was measured against the standard blue wool scale ranging from 1 (lowest lightfastness) to 8 (highest lightfastness). The blue wool scale consists of 8 different blue dyes on wool with gradually increasing lightfastness from 1 to 8. After radiation of the dyed paper samples by the xenon arc fading lamp in a weather-o-meter (a device which simulates rain and sunshine) the lightfastness was evaluated by comparison with the blue wool scale.

Comparative Example 1

Preparation of Direct Brown 44 According to WO-A 2007/057370

Stage 1:

28.12 g of m-phenylenediamine and 8.76 g of 20% by weight of hydrochloric acid were added to 344 ml of water. Ice was added in an amount of 338 g. Then, 15.04 g of sodium nitrite were introduced, followed by the dropwise addition of 78.86 g of 20% by weight of hydrochloric acid within 50 minutes at <3° C. After 10 minutes further 1.73 g of m-phenylenediamine were added and a pH of 3 was set using 13 g of aqueous sodium hydroxide solution (25% by weight). This was followed by stirring at 3° C. for 1 hour.

Stage 2:

To a solution of 34.6 g of sulfanilic acid in 273.46 g of water and 32.4 g of aqueous sodium hydroxide solution (25% by weight) were added 279 g of ice and 68.9 g of sodium nitrite. The mixture was admixed with 82.76 g of hydrochloric acid (20% by weight) at 0-5° C. and subsequently stirred for 30 minutes. The obtained product was combined with the stage 1 product at 20° C. in the course of 90 minutes. All the time, the pH was maintained at pH 5 using aqueous sodium hydroxide solution (25% by weight). After 3 hours at 20° C. the obtained mixture was adjusted to pH 7.5 and then heated to 55-60° C. Hydrochloric acid (20% by weight) was used to adjust the pH to 1, and the solids were filtered off with suction and washed with water to obtain about 300 g of a moist press cake of Direct Brown 44 whose solids content was 22% by weight (sodium content: <0.5% by weight in the dry material).

Production of a Liquid Formulation of Direct Brown 44:

80.33 g of the moist press cake (corresponding to 20.0 g dry weight) were dissolved with 5.25 g of diethanolamine, 3.44 g of aqueous ammonium hydroxide solution (25% $NH_3$), 5 g of polyethylene glycol (average molecular weight: 200) and water to form 100 g of liquid dye.

Paper was made using the above described dyeing process. Lightfastness was measured according to EN ISO 105-B02 with the result: 1, i.e. lowest lightfastness.

Comparative Example 2

Preparation of Direct Yellow 11 According to WO-A 2007/057370

1.10 kg of 5-nitro-o-toluenesulfonic acid (83% by weight, 33.5 mol) was added to 1.5 l of water. A total of 278 g of solid lithium hydroxide (56% purity by weight) was then added continuously in small amounts. 67 g of diethanolamine were added and the mixture was stirred at 50-60° C. for 20 hours and then at 58° C. for 5 hours. Thereafter, 1.7 liters of water were added and a pH of 9.0 was set with glacial acetic acid. The dye was dissolved with 1.85 kg of urea and adjusted to final color strength, compared to a previously defined standard sample, with water. The product was obtained in an amount of 7.26 kg and had a dye content of about 12% by weight.

Direct Brown 44 (D.Br. 44) and Direct Yellow 11 (D.Y. 11) were mixed according to WO-A 2007/057370 resulting in the following composition:
9.4% D.Br. 44 (dry)
6.6% D.Y. 11 (dry)
3.13% Diethanolamine
0.43% $NH_3$
2.50% Polyethylene glycol 200 and
water,
to form 100 g of liquid dye.

Paper was made using the above described dyeing process. Lightfastness was measured according to EN ISO 105-B02 with the result: 1, i.e. lowest lightfastness.

Example 1

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) was added. The resulting solution was dripped into a mixture of 50 mL of hydrochloric acid (30% b.w.), 50 mL of dist. water, and 100 g of ice at −5° C. during 30 min. During addition the temperature was controlled at 10-15° C. The suspension of the diazonium salt was stirred for 3 h at 10-15° C. Excess of nitrite was destroyed by addition of amidosulfonic acid.

Coupling:

In a 3 L beaker containing 35.4 g (188.2 mmol) of 2,4-diamino-1-benzenesulfonic acid in 400 mL of dist. water at room temperature, the diazonium salt (from stage 1) was added during 20 min. at a constant pH 7.5, controlled by the addition of 240 mL of sodium carbonate solution (20% b.v.). The batch was stirred for 2 h at room temperature, pH 8.7. The product (1900 mL) was salted out using 190 g of sodium chloride solution (10% b.v.), using diluted hydrochloric acid the pH was decreased to 4 during stirring for 2 h, and the product was isolated by filtration to yield 441 g of press cake (86.95 mmol product of stage 1). The moist press cake was dried in vacuum at 60° C. to yield 141.6 g of product of the formula

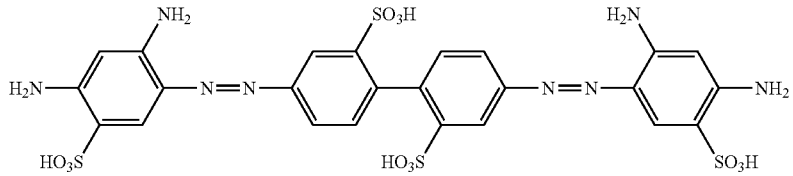 [SMILES: Nc1cc(N)c(S(=O)(=O)O)cc1N=Nc1ccc(-c2ccc(N=Nc3cc(S(=O)(=O)O)c(N)cc3N)cc2S(=O)(=O)O)c(S(=O)(=O)O)c1]

Paper was made using the above described dyeing process.

Lightfastness was measured according to EN ISO 105-B02 with the result: 3.

Example 2

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) was added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt was stirred for 3 h at 10-15° C. Excess of nitrite was destroyed by addition of amidosulfonic acid.

Coupling:

In a 3 L beaker containing 20.4 g (188.2 mmol) of 1,3-diamino-benzene in 400 mL of dist. water at room temperature, pH 10.6, the diazonium salt (from stage 1) was added within 15 min. at a constant pH 8.0, controlled by the addition of 80 mL of sodium carbonate solution (20% b.v.). The batch was stirred for 3 h at room temperature, pH 8.7. The product was isolated by filtration to yield 164 g of press cake (86.95 mmol product of stage 1). The moist press cake was dried in vacuum at 60° C. to yield 71.1 g of product of formula

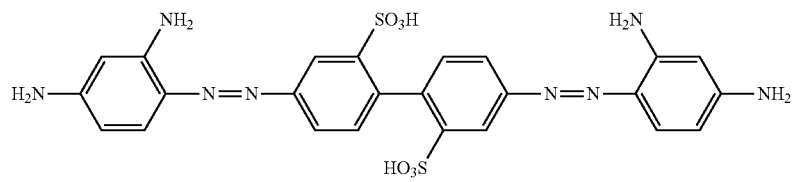

Paper was made using the above described dyeing process.
Lightfastness was measured according to EN ISO 105-B02 with the result: 3.

Example 3

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) was added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt (from stage 1) was stirred for 3 h at 10-15° C. Excess of nitrite was destroyed by addition of amidosulfonic acid.

Coupling:

In a 3 L beaker containing 20.4 g (188.2 mmol) of 1,3-diamino-benzene in 400 mL of dist. water at room temperature, pH 10.6, the diazonium salt (from stage 1) was added within 15 min. at a constant pH 8.0, controlled by the addition of 80 mL of sodium carbonate solution (20% b.v.). The batch was stirred for 3 h at room temperature, pH 8.7. The product was isolated by filtration to yield 164 g of press cake (86.95 mmol).

Stage 2

In a 5 L beaker with stirrer, 1000 mL of distilled water and 60.2 g (347.8 mmol) of o-sulfanilic acid were mixed at room temperature with 18 g of LiOH at pH<11. Cooled with an ice bath and after addition of 600 g of ice, 180 mL (475 mmol) of hydrochloric acid (30% b.w.) was added at pH<0.8 (suspension) and T=5° C., then 300 mL (434.78 mmol) of sodium nitrite solution (100 g/L) was added. The suspension of the diazonium salt was stirred for 45 min. at 10° C. Excess of nitrite was destroyed by addition of amidosulfonic acid, yielding 3633.6 g solution of diazonium salt in stage 2.

Coupling:

In a 1 L beaker containing 13.6 g (7.2 mmol) of press cake stage 1 product in 200 mL of dist. water at room temperature, pH 8.2, 151.4 g of the diazonium solution from stage 2 was added within 20 min. at a constant pH 8.0, controlled by the addition of 40 mL of sodium carbonate solution (20% b.v.). The batch was stirred for 1.5 h at room temperature, filtrated off from a small residue and the 500 mL filtrate was salted out with 100 g of sodium chloride (solution 20% b.v.) during stirring for 1 h, then isolated by filtration to yield 15.8 g of press cake. The moist press cake was dried in vacuum at 60° C. to yield 10.1 g of product of formula

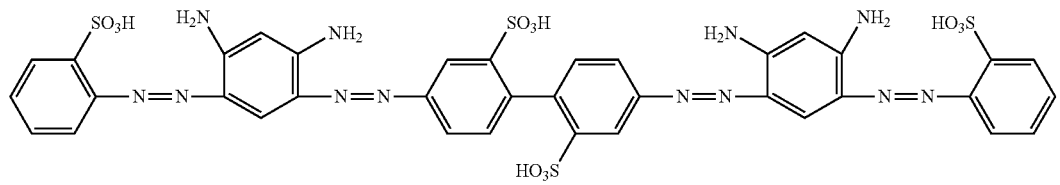 [SMILES: Nc1cc(N)c(N=Nc2ccccc2S(=O)(=O)O)cc1N=Nc1ccc(-c2ccc(N=Nc3cc(N=Nc4ccccc4S(=O)(=O)O)c(N)cc3N)cc2S(=O)(=O)O)c(S(=O)(=O)O)c1]

Paper was made using the above described dyeing process.
Lightfastness was measured according to EN ISO 105-B02 with the result: 3.

Example 4

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) were added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt was stirred for 3 h at 10-15° C. Excess of nitrite was destroyed by addition of amidosulfonic acid.

Coupling:

In a 3 L beaker containing 35.4 g (188.2 mmol) of 2,4-diamino-1-benzenesulfonic acid in 400 mL of dist. water at room temperature, the diazonium salt (from stage 1) was added within 20 min. at a constant pH 7.5, controlled by the addition of 240 mL of sodium carbonate solution (20% b.v.). The batch was stirred for 2 h at room temperature, pH 8.7. The product was salted out with 190 g of sodium chloride solution (10% b.v.), and using diluted hydrochloric acid the pH was decreased to 4 during stirring for 2 h. Isolation was carried out by filtration to yield 441 g of press cake (86.95 mmol of stage 1 product).

Stage 2

In a 1 L beaker with stirrer, 550 mL of distilled water and 16.1 g (57.97 mmol) of 4-[2-(4-aminophenyl)diazenyl]-benzenesulfonic acid were mixed at 60-70° C. Lithium hydroxide (4.2 g) was added resulting in pH=10-11. To this solution, 45 mL (65.22 mmol) of sodium nitrite solution (100 g/L) was added. The resulting solution then was dripped within 15 min. into a mixture of 10 mL of hydrochloric acid (30% b.w.) and 100 mL of dist. water at 40° C. During addition the temperature was controlled at 35° C. The suspension of the diazonium salt (stage 2) was stirred for 2.5 h at 35° C. Excess of nitrite was destroyed by addition of amidosulfonic acid. 789 g of diazonium suspension was yielded. 197.25 g of diazonium solution of stage 2 contains 14.5 mmol diazonium salt.

Coupling:

In a 1 L beaker containing 36.8 g (7.24 mmol) of press cake product of stage 1 in 250 mL of dist. water at room temperature, solved by sodium carbonate solution at pH 7.5-8.5, 197.25 g (14.5 mmol) of the diazonium solution of stage 2 were added within 20 min. at room temperature at a constant pH 7.5, controlled by the addition of 35 mL of sodium carbonate solution (20% b.v.). The batch was stirred for 1.5 h at room temperature; 550 mL of batch solution was salted out by adding 55 g of sodium chloride as aqueous solution (10% b.v.) and 27.5 g of potassium chloride as aqueous solution (5% b.v.) during stirring for 0.5 h at 60° C., wherein the dyestuff precipitates. The dye was isolated by filtration to yield 42.8 g of press cake. The moist press cake was dried in vacuum at 60° C. to yield 14.4 g of product of formula Coupling:

In a 3 L beaker containing 35.4 g (188.2 mmol) of 2,4-diamino-1-benzenesulfonic acid in 400 mL of dist. water at room temperature, the diazonium salt (from stage 1) was added within 20 min. at a constant pH 7.5, controlled by the addition of 240 mL of sodium carbonate solution (20% b.v.). The batch was stirred for 2 h at room temperature, pH 8.7. The product (1900 mL) was salted out using 190 g of sodium chloride solution (10% b.v.), using diluted hydrochloric acid the pH was decreased to 4 during stirring for 2 h. Isolation was carried out by filtration to yield 441 g of press cake (86.95 mmol of product of stage 1).

Stage 2

In a 1 L beaker with stirrer, 300 mL of distilled water at 40° C. and 9.3 g (29.1 mmol) of 2-(4-aminophenyl)-6-methylbenzothiazolesulphonic acid were mixed with 1.9 g of LiOH resulting in pH 11. A solution of 25 mL (36.23 mmol) of sodium nitrite (100 g/L) was added. This mixture was added to a solution of 25 mL of hydrochloric acid (30% b.w.), and 100 mL of dist. water at 40° C. within about 5 min. The reaction mixture was stirred at 35° C. for 2 h. Excess of nitrite was destroyed by addition of amidosulfonic acid, then the reaction mixture was filtrated and the obtained press cake was washed three times with 100 mL of diluted hydrochloric acid

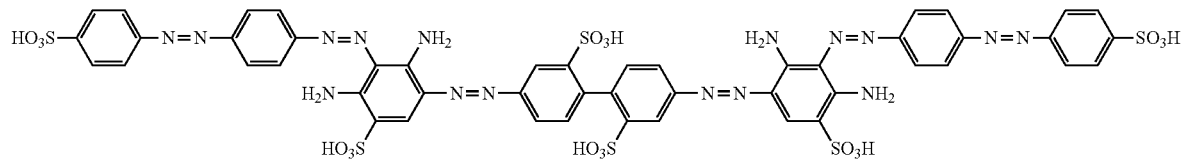 [SMILES: Nc1c(N=Nc2ccc(-c3ccc(N=Nc4cc(S(=O)(=O)O)c(N)c(N=Nc5ccc(N=Nc6ccc(S(=O)(=O)O)cc6)cc5)c4N)cc3S(=O)(=O)O)c(S(=O)(=O)O)c2)cc(S(=O)(=O)O)c(N)c1N=Nc1ccc(N=Nc2ccc(S(=O)(=O)O)cc2)cc1]

Paper was made using the above described dyeing process.
Lightfastness was measured according to EN ISO 105-B02 with the result: 3.

Example 5

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) was added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt was stirred for 3 h at 10-15° C. Excess of nitrite was destroyed by addition of amidosulfonic acid.

(3 g 30% HCl in 300 g of solution) resulting in 28.2 g of press cake in 150 g of distilled water. 75 g of diazonium solution refers to 14.5 mmol of diazonium solution of stage 2.

Coupling:

In a 1 L beaker containing 936.8 g (7.24 mmol) of press cake product of stage 1 in 250 mL of dist. water at room temperature, solved by sodium carbonate solution at pH 7.5-8.5, 75 g (14.5 mmol) of the stage 2 diazonium solution were added within 5 min. and heated in 14 min. at 40° C. at a constant pH 7.5, controlled by the addition of 20 mL of sodium carbonate solution (20% b.v.). The batch was stirred for 1.5 h at room temperature. Then, 400 mL of solution was salted out by adding 20 g of sodium chloride as aqueous solution (5% b.v.) during stirring for 0.5 h at 40° C., wherein the dyestuff precipitates. The dye was isolated by filtration to yield 125.5 g of press cake. The moist press cake was dried in vacuum at 60° C. to yield 24.2 g of product of formula

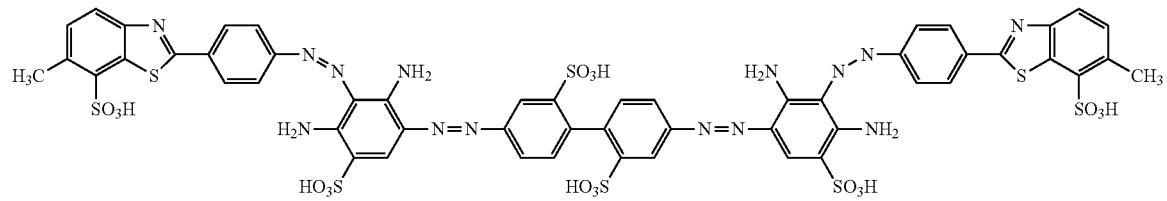

Paper was made using the above described dyeing process. Lightfastness was measured according to EN ISO 105-B02 with the result: 3.

Example 6

Stage 1

In a 1 L beaker with stirrer, 200 mL of distilled water and 6.72 g (21.74 mmol) of 2-[(4-aminophenyl)amino]-5-nitrobenzenesulfonic acid were mixed at 60-70° C. Lithium hydroxide (4.2 g) was added resulting in pH>11. The solution was filtered in presence of 2 g of activated charcoal, yielding a filtrate of 239 g of solution. To this solution, 20 mL (28.98 mmol) of sodium nitrite solution (100 g/L) was added. The resulting solution then was dripped within 10 min. into a mixture of 10 mL of hydrochloric acid (30% b.w.), and 100 mL of dist. water at 40° C. During addition the temperature was controlled at 35° C. The suspension of the diazonium salt was stirred for 2 h at 35° C. Excess of nitrite was destroyed by addition of amidosulfonic acid. 500 mL of diazonium suspension was yielded in stage 1.

Coupling:

In a 1 L beaker containing 3.74 g (10.87 mmol) of 4,4'-diamino-[1,1'-biphenyl]-2,2'-disulfonic acid in 140 mL of dist. water at room temperature, solved by sodium carbonate solution at pH 6.5-7.0, 500 mL of the diazonium solution (from stage 1) was added within 30 min. and heated within 20 min. at 50° C. at a constant pH 8.5, controlled by the addition of 70 mL of sodium carbonate solution (20% b.v.). The batch was stirred for 1.5 h at room temperature. Then, 650 mL of solution was salted out using 65 g of sodium chloride, potassium chloride each (solution 10% b.v.) during stirring for 1 h. The product was isolated by filtration to yield 15.5 g of press cake. The moist press cake was dried in vacuum at 60° C. to yield 7 g of product of formula

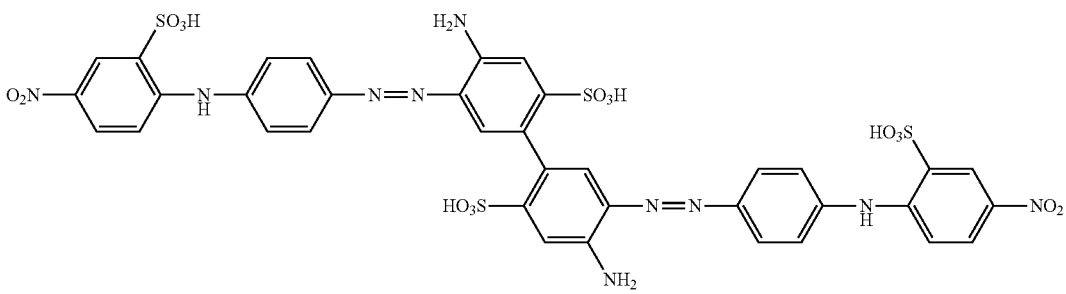

Paper was made using the above described dyeing process. Lightfastness was measured according to EN ISO 105-B02 with the result: 3.

Example 7

Stage 1

In a 1 L beaker with stirrer, 600 mL of distilled water and 24.9 g (72.46 mmol) of 4,4'-diamino-[1,1'-biphenyl]-2,2'-disulfonic acid were mixed at room temperature. Lithium hydroxide (7.4 g) was added resulting in pH=6. To this solution, 22 mL (159.42 mmol) of sodium nitrite solution (500 g/L) was added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt was stirred for 3 h at 10-15° C. Excess of nitrite was destroyed by addition of amidosulfonic acid. The pH was increased from 1 to 3.9 by adding 150 ml of sodium acetate solution (20% b.w.).

Coupling:

In a 3 L beaker containing 19.9 g (144.93 mmol) of 1-amino-2-methoxy-5-methylbenzene, solved in 150 g of acetone at room temperature was added the diazonium salt solution (from stage 1) within 20 min. at 13° C., wherein the pH decreased to 3.7. After 12 hours, diazonium salt still was detectable in 1.5 L suspension at pH=3.5. 7.9 g (56 mmol) of 1-amino-2-methoxy-5-methylbenzene dissolved in 50 g of acetone were added, controlled by the addition of 104 mL of sodium carbonate solution (20% b.v.). The batch was stirred for 2 h at room temperature at pH 6.5, while the product partly precipitated. After adding 30 mL of caustic soda (400 g/L) the pH increased to 12.5-12.8. The reaction mixture was heated to 80° C. and 10 g of activated charcoal was added, and it was held at 80° C. for 10 min. The product was salted out using 64 mL of hydrochloric acid (30% b.w.), wherein the pH decreased to 4 during stirring for 2 h. Isolation was carried out by filtration to yield 245 g of press cake (101.45 mmol of stage 1 product).

Stage 2

In a 2 L beaker with stirrer, 700 mL of distilled water and 98 g of press cake product of stage 1 were mixed with 18 g of caustic soda (200 g/L) resulting in pH>11. A solution of 50 mL (72.46 mmol) of sodium nitrite (100 g/L) was added. This mixture was added to a solution of 60 mL of hydrochloric acid (30% b.w.), 150 mL of dist. water and 50 g of ice within about 30 min. The temperature was increased from −5° C. at the beginning to 15° C. at the end of addition, pH was 1.2. The reaction mixture was stirred for 2 h. Excess of nitrite was destroyed by addition of amidosulfonic acid.

Coupling:

In a 3 L beaker containing 15.4 g (101.45 mmol) of cyanoimino barbituric acid, solved with sodium carbonate solution in 400 mL of dist. water at pH 7, the diazonium salt solution of stage 2 was added within 20 min. at constant pH 7, controlled by the addition of 280 mL of sodium carbonate solution (20% b.w.). The batch was stirred for 2 h at room temperature, pH 8.8. The product was isolated by filtration to yield 159 g of press cake (217.39 mmol of stage 2 product). The moist press cake was dried in vacuum at 60° C. to yield 40 g of product of formula

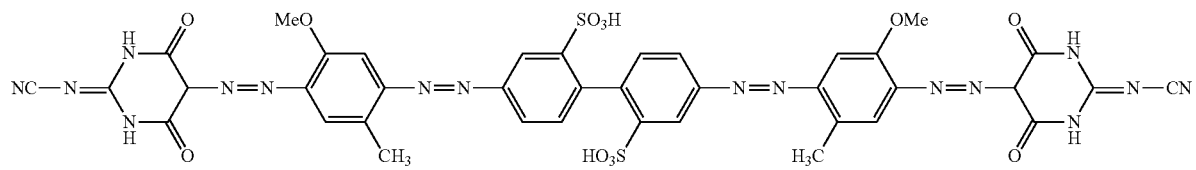 [SMILES: COc1cc(N=Nc2ccc(-c3ccc(N=Nc4cc(OC)c(N=NC5C(=O)NC(=NC#N)NC5=O)cc4C)cc3S(=O)(=O)O)c(S(=O)(=O)O)c2)c(C)cc1N=NC1C(=O)NC(=NC#N)NC1=O]

Paper was made using the above described dyeing process. Lightfastness was measured according to EN ISO 105-B02 with the result: 3.

Example 8

Stage 1

In a 1 L beaker with stirrer, 600 mL of distilled water and 30.0 g (86.99 mmol) of 4,4'-diamino-[1,1'-biphenyl]-2,2'-disulfonic acid were mixed at room temperature. Lithium hydroxide (9.0 g) was added resulting in pH=11.5. To this solution, 27 mL (195.65 mmol) of sodium nitrite solution (500 g/L) was added. The resulting solution then was dripped within 30 min. into a mixture of 50 mL of hydrochloric acid (30% b.w.), 50 mL of dist. water, and 100 g of ice at −5° C. During addition the temperature was controlled at 10-15° C. The suspension of the diazonium salt was stirred for 3 h at 10-15° C. Excess of nitrite was destroyed by addition of amidosulfonic acid.

diazonium salt was stirred for 2 h at 15° C. Excess of nitrite was destroyed by addition of amidosulfonic acid, resulting in 743 g of diazonium solution of stage 2.

Coupling:

In a 1 L beaker containing 12.36 g (43.5 mmol) of 1-(4-sulfophenyl)-3-carboxy-5-pyrazolone, solved with sodium carbonate solution in 160 mL of dist. water at pH 6.5, 371.5 g (14.5 mmol) of the diazonium solution of stage 2 were added within 25 min. at a constant pH 7.5, controlled by the addition of 48 mL of sodium carbonate solution (20% b.v.). The batch was stirred for 2 h at room temperature, pH 8.8. The product was salted out using 120 g of sodium chloride as solution (20% b.v.) and 30 g of potassium chloride as solution (5% b.v.) during stirring for 0.5 h, wherein the dyestuff precipitates. The dye was isolated by filtration to yield 36.1 g of press cake (217.39 mmol of stage 2 product). The moist press cake was dried in vacuum at 60° C. to yield 23.4 g of product of formula

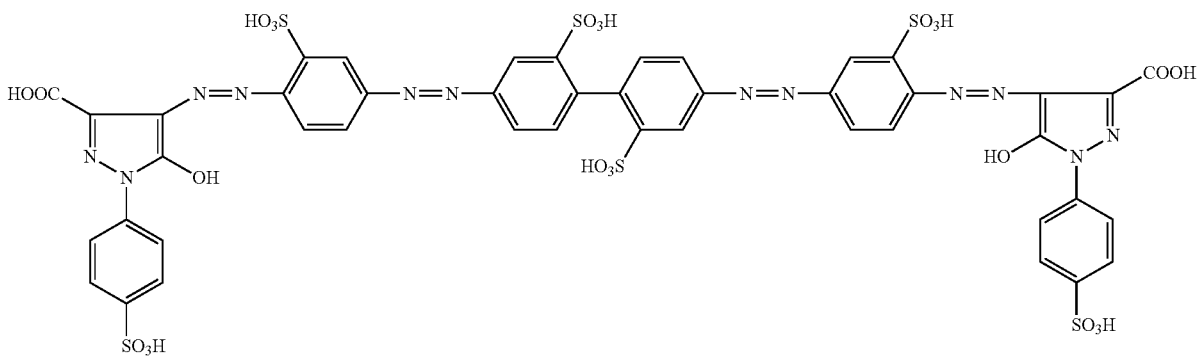 [SMILES: O=C(O)c1nn(-c2ccc(S(=O)(=O)O)cc2)c(O)c1N=Nc1ccc(N=Nc2ccc(-c3ccc(N=Nc4ccc(N=Nc5c(C(=O)O)nn(-c6ccc(S(=O)(=O)O)cc6)c5O)c(S(=O)(=O)O)c4)cc3S(=O)(=O)O)c(S(=O)(=O)O)c2)cc1S(=O)(=O)O]

Coupling:

In a 3 L beaker containing 33.1 g (191.3 mmol) of 2-amino-1-benzenesulfonic acid in 400 mL of dist. water at room temperature, the diazonium salt (from stage 1) was added within 20 min. at a constant pH 6.5, controlled by the addition of 200 mL of sodium carbonate solution (20% b.v.). The batch was stirred for 3 h at room temperature, pH 8.7. The product was collected as 1726 g of solution (86.95 mmol of product stage 1).

Stage 2

In a 1 L beaker with stirrer, 575.4 g of the solution (28.99 mmol) of the stage 1 product was cooled down to 10° C. After addition of 33 mL of hydrochloric acid (30% b.w.) and 50 g of ice at 5-7° C., 55 mL (79.7 mmol) of sodium nitrite solution (100 g/L) was added during 5 min. The suspension of the Paper was made using the above described dyeing process. Lightfastness was measured according to EN ISO 105-B02 with the result: 3.

Example 9

Liquid Formulation

The same dye as prepared in Example 8 in a solid form was prepared as a liquid formulation. In this, the procedure was carried out as in Example 8 except that the coupling of stage 2 was carried out as follows:

In a 1 L beaker containing 12.36 g (43.5 mmol) of 1-(4-sulfophenyl)-3-carboxy-5-pyrazolone, solved with sodium carbonate solution in 160 mL of dist. water at pH 6.5, 371.5 g (14.5 mmol) of diazonium solution of stage 2 was added within 25 min. at a constant pH 7.5 controlled by the addition of 14 g of triethanolamine. The reaction mixture was stirred for 1 h at 15-20° C., the pH was adjusted to 8. The solution was filtered through a filter paper (Blauband). After desalting of the dye solution in a desalting cell until indication of a sodium content of 0.1%, the pH was again adjusted to 7.5 to yield a dye solution ready for use.

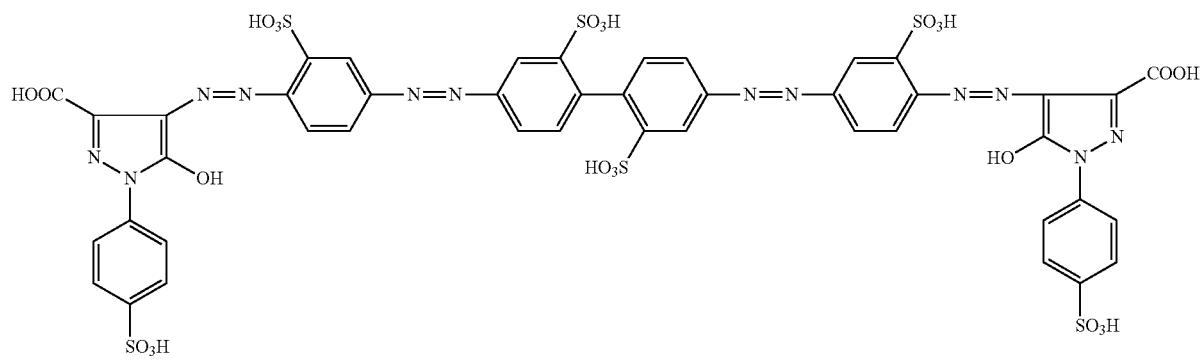 [SMILES: O=C(O)c1nn(-c2ccc(S(=O)(=O)O)cc2)c(O)c1N=Nc1ccc(N=Nc2ccc(-c3ccc(N=Nc4ccc(N=Nc5c(C(=O)O)nn(-c6ccc(S(=O)(=O)O)cc6)c5O)c(S(=O)(=O)O)c4)cc3S(=O)(=O)O)c(S(=O)(=O)O)c2)cc1S(=O)(=O)O]

Paper was made using the above described dyeing process.

Lightfastness was measured according to EN ISO 105-B02 with the result: 3.

All papers obtained in the Examples and Comparative Examples exhibited brownish shades.

The examples show that the dyes of the invention provide paper with higher lightfastness than paper produced with known dye mixtures.

The invention claimed is:

1. A compound of formula (1)

formula 1

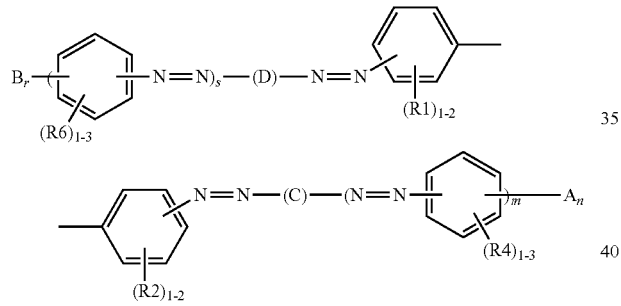

wherein

R1, R2, independently of each other, represent hydrogen, substituted or unsubstituted alkoxyl, substituted or unsubstituted aryl, substituted or unsubstituted phenyl, amino, sulfonic, carboxyl, hydroxyl, or halogen groups; and one or both of R1 and R2 is a sulfonic group;

C, D, independently of each other, represent

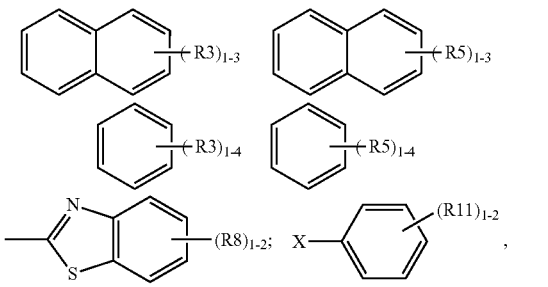

R3 and R5, independently of each other, represent hydrogen, substituted or unsubstituted alkyl, substituted or unsubstituted alkoxyl, substituted or unsubstituted aryl, substituted or unsubstituted phenyl, amino, nitro, sulfonic, carboxyl, hydroxyl, or halogen groups; R8, R11 and X are as defined below;

R4, R6, independently of each other, represent hydrogen, substituted or unsubstituted alkyl, substituted or unsubstituted alkoxyl, substituted or unsubstituted aryl, substituted or unsubstituted phenyl, amino, sulfonic, carboxyl, hydroxyl, or halogen groups;

m, n, r, independently of each other, are 0 or 1, and s is 1

A, B independently of each other, represent

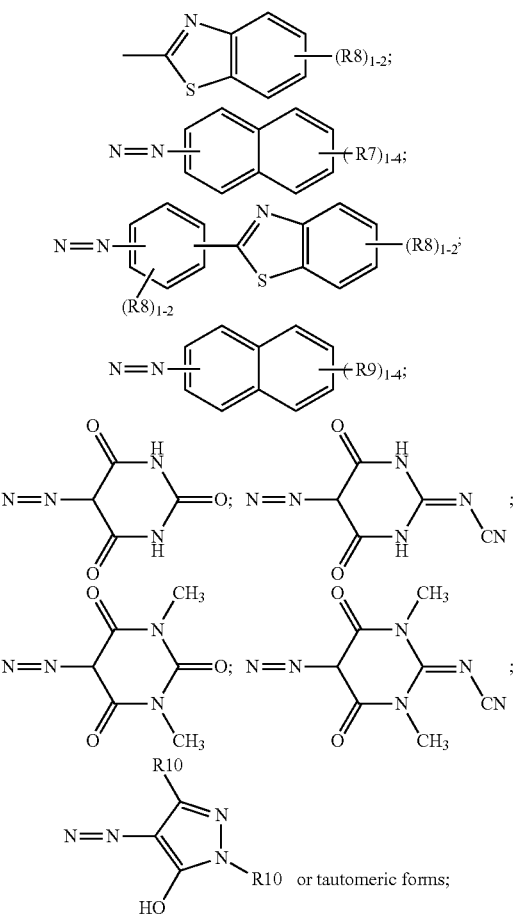

-continued

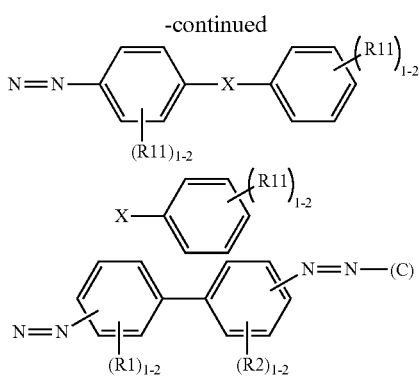

wherein R1, R2 and C are as defined above,

R7 to R11 represent, independently of each other, hydrogen, substituted or unsubstituted alkyl, substituted or unsubstituted alkoxy, substituted or unsubstituted aryl, substituted or unsubstituted phenyl, sulfonic, carboxyl, amino, nitro, hydroxyl, or halogen groups; and X represents O, S, NH, SO$_2$, CH=CH, NHCO, NH—CO—NH, N=N, or N=N(O).

2. The compound of claim 1, having the following structure:

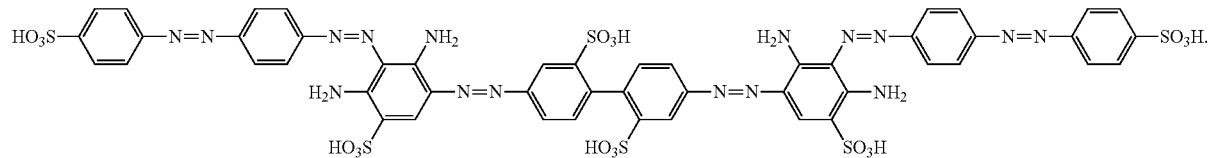 [SMILES: Nc1c(N=Nc2ccc(-c3ccc(N=Nc4cc(S(=O)(=O)O)c(N)c(N=Nc5ccc(N=Nc6ccc(S(=O)(=O)O)cc6)cc5)c4N)cc3S(=O)(=O)O)c(S(=O)(=O)O)c2)cc(S(=O)(=O)O)c(N)c1N=Nc1ccc(N=Nc2ccc(S(=O)(=O)O)cc2)cc1]

3. The compound of claim 1, having the following structure:

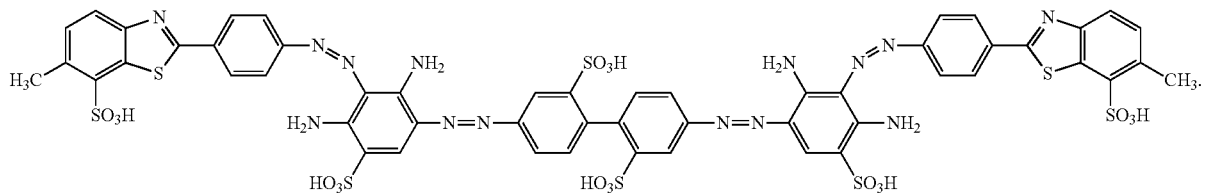 [SMILES: Cc1ccc2nc(-c3ccc(/N=N\c4c(N)c(N=Nc5ccc(-c6ccc(N=Nc7cc(S(=O)(=O)O)c(N)c(/N=N\c8ccc(-c9nc%10ccc(C)c(S(=O)(=O)O)c%10s9)cc8)c7N)cc6S(=O)(=O)O)c(S(=O)(=O)O)c5)cc(S(=O)(=O)O)c4N)cc3)sc2c1S(=O)(=O)O]

4. The compound of claim 1, having the following structure:

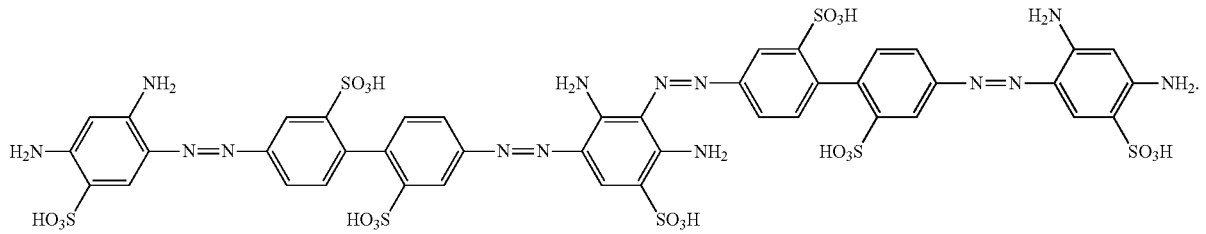 [SMILES: Nc1cc(N)c(S(=O)(=O)O)cc1N=Nc1ccc(-c2ccc(N=Nc3cc(S(=O)(=O)O)c(N)c(N=Nc4ccc(-c5ccc(N=Nc6cc(S(=O)(=O)O)c(N)cc6N)cc5S(=O)(=O)O)c(S(=O)(=O)O)c4)c3N)cc2S(=O)(=O)O)c(S(=O)(=O)O)c1]

5. A compound having the following structure:

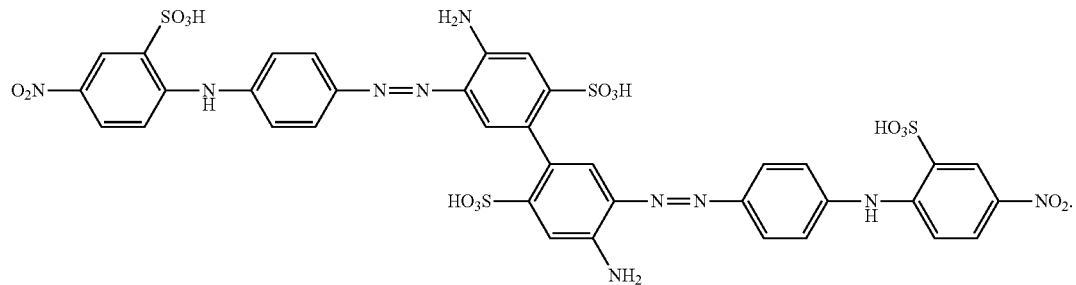 [SMILES: Nc1cc(S(=O)(=O)O)c(-c2cc(N=Nc3ccc(Nc4ccc([N+](=O)[O-])cc4S(=O)(=O)O)cc3)c(N)cc2S(=O)(=O)O)cc1N=Nc1ccc(Nc2ccc([N+](=O)[O-])cc2S(=O)(=O)O)cc1]

6. A compound having the following structure:

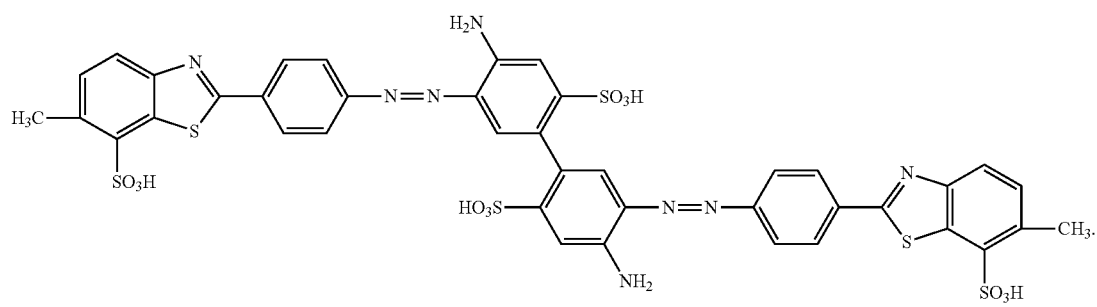 [SMILES: Cc1ccc2nc(-c3ccc(N=Nc4cc(-c5cc(N=Nc6ccc(-c7nc8ccc(C)c(S(=O)(=O)O)c8s7)cc6)c(N)cc5S(=O)(=O)O)c(S(=O)(=O)O)cc4N)cc3)sc2c1S(=O)(=O)O]

7. The compound of claim 1, having the following structure:

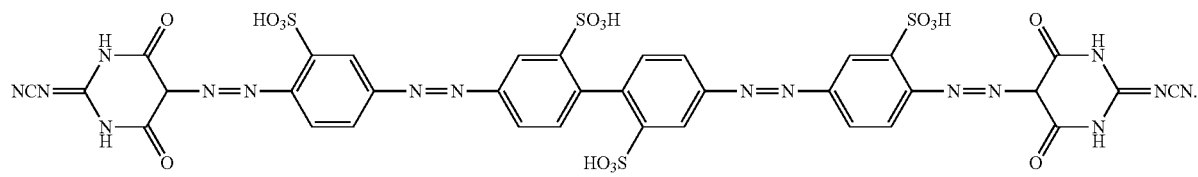

8. The compound of claim 1, wherein in the sulfonic group with the meaning —$SO_3M$, M is a cation.

9. A process for preparing a compound of formula (1) according to claim 1, comprising tetra-azotizing a compound of formula (2)

formula 2

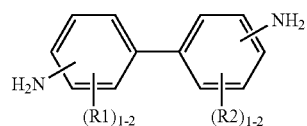

coupling the obtained product with a compound of formula (3), (3a), (3b), (3c), (3d) or (3e)

formula 3

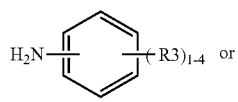 or

-continued formula 3a

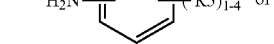 or formula 3b

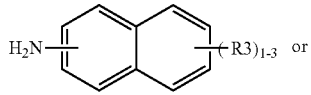 or formula 3c

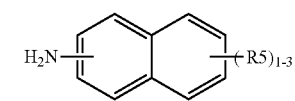

formula 3d

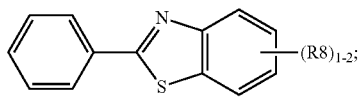

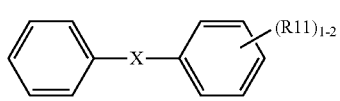

optionally diazotizing again, and reacting with a compound of formula (4) or (4a)

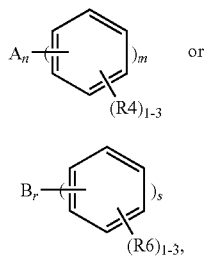

with the proviso that m is 1 in formula (4) and s is 1 in formula (4a), to obtain the compound of formula (1).

10. A process for dyeing or printing materials, wherein the material is brought into contact with a compound of formula (1) according to claim 1.

11. The process according to claim 10, wherein the materials used contain cellulose and/or polyamide, in particular cellulose.

12. The process according to claim 10, wherein the material used is paper or board.

13. The process according to claim 10, wherein the material used is a fiber-containing or fibrous material.

14. A product or paper obtainable by a process according to claim 10.

15. The compound of claim 8, wherein M is hydrogen, alkaline metal, earth alkaline metal, ammonium, or mono-, di-, tri- or tetra-substituted ammonium.

16. The compound of claim 15, wherein M is mono-$C_{1-5}$-alkyl-, di-$C_{1-5}$-alkyl-, tri-$C_{1-5}$-alkyl-, tetra-$C_{1-5}$-alkylammonium, mono-$C_{1-5}$-hydroxyalkyl-, di-$C_{1-5}$-hydroxyalkyl-, tri-$C_{1-5}$-hydroxyalkyl-, tetra-$C_{1-5}$-hydroxyalkyl-ammonium, or benzyltri-$C_{1-5}$-hydroxyalkylammonium.

\* \* \* \* \*